(12) United States Patent
Bonardo et al.

(10) Patent No.: US 12,509,049 B2
(45) Date of Patent: Dec. 30, 2025

(54) VALVE UNIT FOR AN ANTI-LOCK BRAKING SYSTEM

(71) Applicant: RAICAM DRIVELINE S.R.L., Mondovi' (IT)

(72) Inventors: Sandro Bonardo, Peveragno (IT); Benjamin Chetwood Struve', Kenilworth (GB)

(73) Assignee: Raicam Driveline S.R.L., Mondovi' (IT)

( * ) Notice: Subject to any disclaimer, the term of this patent is extended or adjusted under 35 U.S.C. 154(b) by 384 days.

(21) Appl. No.: 18/259,642

(22) PCT Filed: Dec. 23, 2021

(86) PCT No.: PCT/EP2021/087461
§ 371 (c)(1),
(2) Date: Jun. 28, 2023

(87) PCT Pub. No.: WO2022/144295
PCT Pub. Date: Jul. 7, 2022

(65) Prior Publication Data
US 2024/0067152 A1    Feb. 29, 2024

(30) Foreign Application Priority Data
Dec. 29, 2020    (IT) .................. 102020000032681

(51) Int. Cl.
*B60T 15/36*    (2006.01)
*B60T 15/02*    (2006.01)

(52) U.S. Cl.
CPC ............ *B60T 15/36* (2013.01); *B60T 15/028* (2013.01); *B60T 2260/06* (2013.01)

(58) Field of Classification Search
CPC .... B60T 18/36; B60T 15/028; B60T 2260/06; B60T 8/3615; B60T 8/329; B60T 13/662
See application file for complete search history.

(56) References Cited

U.S. PATENT DOCUMENTS 3,813,130 A    5/1974  Inada
8,186,772 B2 *  5/2012  Suzuki .................. B60T 8/4077
                                                303/114.1

(Continued)

FOREIGN PATENT DOCUMENTS

JP        H0717673    *  3/1995
WO    2010019575 A1    2/2010

OTHER PUBLICATIONS

International Search Report for International Patent Application No. PCT/EP2021/087461, mailed Mar. 29, 2022.

*Primary Examiner* — Pamela Rodriguez
(74) *Attorney, Agent, or Firm* — Armstrong Teasdale LLP

(57) ABSTRACT

A valve unit for an ABS system having a single hydraulic chamber configured to receive a brake fluid, with a delivery port for supplying the brake fluid to a brake caliper, and a passage to for letting the brake fluid from a master cylinder into the single hydraulic chamber is provided. A single piston, longitudinally movable within the single hydraulic chamber, has first transverse surfaces facing the delivery port and defining as a whole a first transverse area, second transverse surfaces facing away from the delivery port and defining as a whole a second transverse area greater than the first transverse area. A longitudinal cavity extends in the single piston establishing fluid communication between the first and second transverse surfaces, whereby displacement of the single piston towards the delivery port occludes the passage and increments the volume available for the brake fluid in the single hydraulic chamber.

16 Claims, 16 Drawing Sheets

(56) References Cited

U.S. PATENT DOCUMENTS 9,227,611 B2 * 1/2016 Gilles ................... B60T 8/3275
2011/0241419 A1 * 10/2011 Ohkubo ................... B60T 1/10
303/9.62

* cited by examiner

VALVE UNIT FOR AN ANTI-LOCK BRAKING SYSTEM

CROSS-REFERENCE TO RELATED APPLICATIONS

This application is a National Stage Application of International Patent Application No. PCT/EP2021/087461, having an International Filing Date of Dec. 23, 2021, claiming priority to Italian Patent Application No. 102020000032681, having a filing date of Dec. 29, 2020, each of which is hereby incorporated by reference in its entirety.

TECHNICAL FIELD

The present invention relates to a valve unit for a hydraulic braking system to control the anti-lock function of a vehicle wheel.

BACKGROUND ART

Anti-lock Braking Systems (ABS) have been installed on vehicles with hydraulic brakes, to prevent skidding, or uncontrolled skidding, reducing the effects of stopping suddenly. A system of this kind is illustrated in FIG. 1, where the four wheels of a motor vehicle are equipped with brake discs E1-E4 and related sensors S1-S4, operationally facing phonic wheels F1-F4 or equivalent elements secured for rotation with the brake discs. In a per se known manner, sensors S1-S4, detect the rotational speeds of the wheels to which they are associated and send, for example via wirings N1-N4, signals indicative of the rotation speeds to an Electronic Control Unit (ECU) which processes the speed signals received. A brake caliper G1-G4 is associated with each brake disc. A master cylinder M activated by a pedal control C activates the brake calipers through respective hydraulic pipes H1-H4, on each of which a valve unit ABS1-ABS4 is installed. Each ABS valve unit controls the flow and pressure of the brake fluid towards the associated brake caliper, in response to electrical control signals from the electronic control unit. When the ECU detects a condition indicative of an imminent locking of a wheel, it operates the respective ABS valve to reduce the hydraulic pressure on the brake at the affected wheel, thus reducing the braking force on this wheel, so that the wheel remains braked but can rotate. This process is repeated continuously during braking, several times per second, preventing the vehicle from skidding.

Valve units have been proposed for an anti-lock braking system of a vehicle, wherein the valve unit comprises a valve body with a delivery port hydraulically connectable to a brake caliper, an inlet port hydraulically connectable to a master cylinder, a primary hydraulic chamber in fluid communication with the delivery port and a second hydraulic expansion chamber. An outflow passage provides fluid communication between the primary hydraulic chamber and the expansion chamber, and a bypass passage provides fluid communication between the inlet port and the delivery port. A piston is longitudinally movable in the hydraulic chamber, operated by a solenoid controlled by an electronic control unit, in contrast to the force of an elastic element. Under normal braking conditions, the force of the elastic element holds the piston in a position in which the piston occludes the outflow passage but does not occlude the bypass passage. Under locked-wheel braking conditions, the piston is moved to a position where it occludes the bypass passage while clearing the outflow passage, allowing part of the brake fluid to drain from the primary hydraulic chamber into the outflow chamber. As a result, the pressure on the caliper is reduced, unlocking the wheel.

SUMMARY OF THE INVENTION

A primary object of the present invention is to provide an improved and simplified ABS valve unit, which can be activated more progressively as compared to known ABS valve units.

The present invention proposes to solve the aforesaid technical problem by gradually adjusting the temporary removal of the brake fluid, during braking while the wheel is locked, from the part of the hydraulic braking circuit which includes the brake caliper of the locked wheel.

According to an aspect, the present invention provides a valve unit for a hydraulic braking system to control the anti-lock function of a vehicle wheel. Preferred embodiments are also described.

In summary, an ABS valve unit comprises a single hydraulic chamber configured to receive brake fluid and containing a single longitudinally movable piston. The hydraulic chamber has a delivery port to send brake fluid to a brake caliper, and a passage through which it can receive brake fluid sent from a master cylinder. The piston has one or more first transverse surfaces facing the delivery port, defining a first transverse area, and one or more second transverse surfaces facing away from the delivery port, and defining as a whole a second transverse area. The second transverse area is larger than the first transverse area. A longitudinal cavity extends into the piston establishing fluid communication between the first transverse surfaces and the second transverse surfaces. Consequently, a displacement of the piston towards the delivery port closes the passage and gradually increases the volume available for the brake fluid in the hydraulic chamber.

BRIEF DESCRIPTION OF THE DRAWINGS

In order that the present invention may be well understood there will now be described a few preferred embodiments thereof, given by way of example, reference being made to the accompanying drawings, in which.

DETAILED DESCRIPTION OF THE INVENTION

Figure 1:
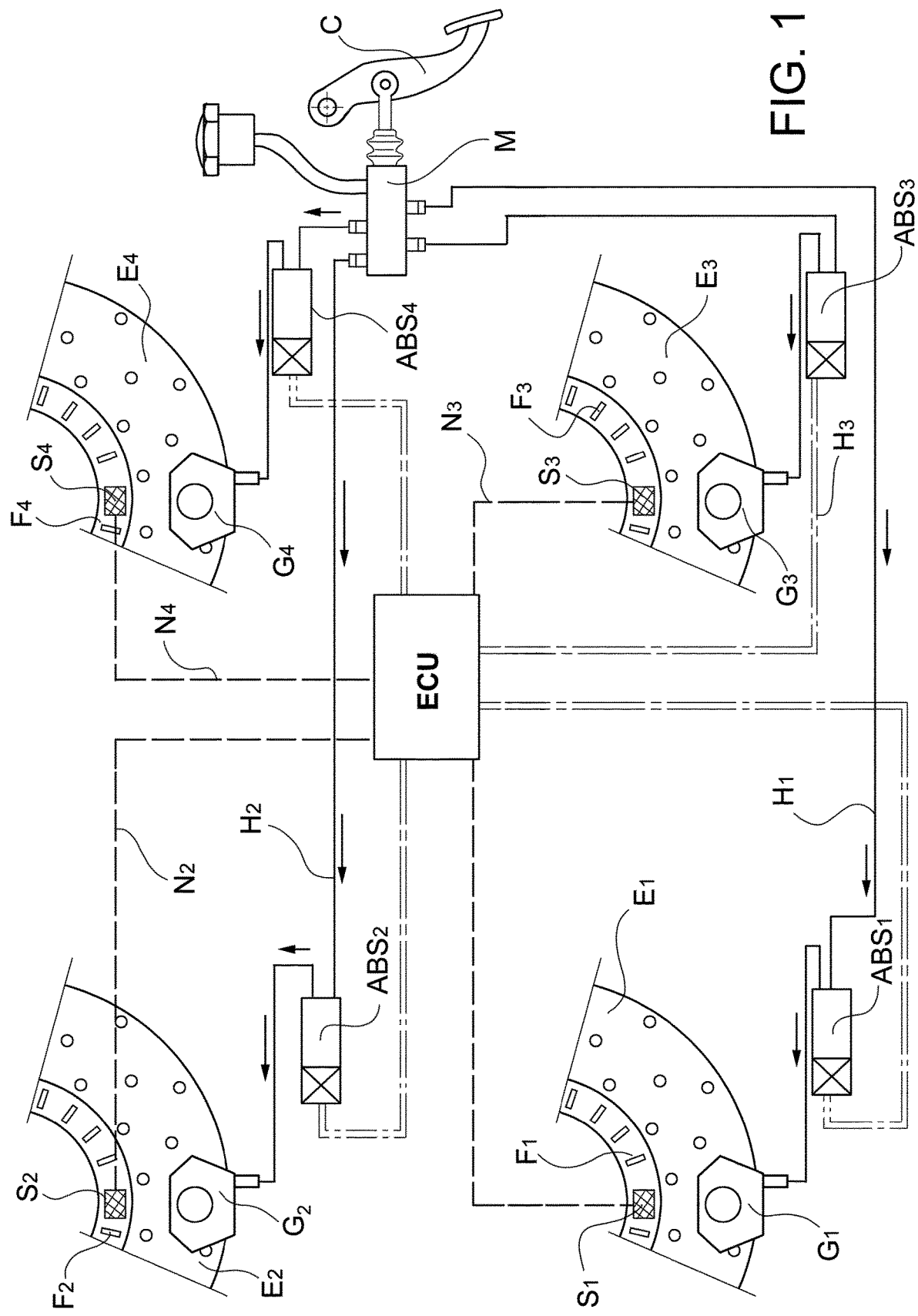
FIG. 1 is a diagram schematically depicting the operation of an anti-lock braking system on a vehicle.

With reference to FIGS. 2 to 6, reference number 10 indicates as a whole an ABS valve unit for an anti-lock braking system of a vehicle wheel. The valve unit 10 defines a longitudinal axis x and has an elongated shape in the direction defined herein as longitudinal or axial. In this context, terms indicating positions and orientations such as "longitudinal", "transverse" and "radial", should be construed as referring to the x axis.

The valve unit 10 comprises a body 11 defining a longitudinal direction of actuation. In this example, the body 11 has a generally cylindrical tubular shape, with a first end 12 and a second end 13 opposite the first.

The end 12 of the body 11 forms a delivery port (or outlet port) 14, which can be hydraulically connected to a brake caliper G of the brake of a vehicle wheel, and an inlet port 17, which can be hydraulically connected to a master cylinder M, which is operatively associated with a pedal or manual lever actuation control C on the vehicle.

The body 11 includes a single hydraulic chamber 15 which communicates with the delivery port 14 and longitudinally receives a single piston 18.

The hydraulic chamber 15 forms a first end section 19 (or distal section) with a diameter D1 closer to the delivery port 14, a second intermediate section 20 with a diameter D2 greater than the diameter D1, and a third section 21 (or section proximal) with a diameter D3 smaller than the diameter D1, farthest from the delivery port 14. Correspondingly, the piston 18 comprises an end portion 22 received in the first end section 19 of the hydraulic chamber 15, an intermediate portion 23 received in the second intermediate section 20 of the hydraulic chamber 15, and a proximal portion 24 received in the third proximal section 21 of the hydraulic chamber 15.

The end portion 22 of the piston 18 is provided with a pair of end seals 26, 27 longitudinally adjacent and spaced by a short distance from one another. The seals 26, 27 are in sliding contact with the end section 19 of the hydraulic chamber 15. The intermediate portion 23 of the piston 18 is provided with at least one intermediate sealing gasket 28 which engages against the intermediate section 20 of the hydraulic chamber 15. A proximal seal 30 is mounted on the proximal portion 24 of the piston so as to sealingly engage the third section 21 of the hydraulic chamber 15.

The piston 18 forms a longitudinal cavity 31 which extends through the piston from an end face 32 of the end portion of the piston, facing the delivery port 14. The longitudinal cavity 31 communicates with a transverse passage 33 which opens onto a lateral surface of the piston. The transverse passage 33 faces the intermediate section 20 of the hydraulic chamber 15.

An elastic element 34 urges the piston 18 away from the delivery port 14. In the example of embodiment of FIGS. 2-6, the elastic element 34 is received in the second end 13 of the valve body 11 opposite the first end 12 which has the inlet port 17 and delivery port 14.

In the embodiment of FIGS. 2-6, the elastic element 34 is made as a single compression spring, compressed longitudinally between a shoulder 35 of the body 11 and a transverse contrast wall 36, facing the shoulder 35 and longitudinally spaced from this.

The transverse contrast wall 36 is received with transverse play and is longitudinally movable within a chamber 38 advantageously formed by the body 11.

A rod 37 connects longitudinally the transverse contrast wall 36 to the piston 18.

The longitudinal compression of the elastic element 34 urges the transverse contrast wall 36 to the left, and this consequently pulls the piston 18 to the left through the rod 37.

The longitudinal distance between the transverse contrast wall 36 and the shoulder 35 can be adjusted to vary the longitudinal elastic force with which the elastic element moves the piston 18 away from the delivery port 14.

According to one embodiment, the rod 37 can be made as a threaded stem which engages through a corresponding threaded through hole 39, formed through the transverse contrast wall 36.

The rod 37 can have an enlarged terminal head 40 with a circular cross section, for example spherical, engaged in a corresponding recess 41 formed in the portion 24 of the piston 18.

An actuation device 42, electrically connectable to an electronic control unit (ECU) mounted on board the vehicle, is provided to activate the valve unit 10. The actuation device 42 is operatively connected to the piston 18.

In the embodiment illustrated in FIGS. 2-6, the actuation device 42 serves to longitudinally move the piston towards the delivery port 14. The actuation device 42 also serves to temporarily vary the elastic force with which the elastic element urges the piston 18 away from the delivery port 14. The actuation device 42 can in fact vary the longitudinal position of the transverse contrast wall 36 along the rod 37, thus adjusting the distance between the transverse contrast wall 36 and the shoulder 35, and consequently the length of the elastic element 34 and its compression. By making the rod 37 rotate in a given direction of rotation around its own longitudinal axis 37A by means of the actuation device 42, in such a way as to compress more and therefore longitudinally shorten the elastic element 34, consequently the traction force with which the piston 18 is moved away from the delivery port 14 increases. Vice versa, by making the rod 37 rotate in an opposite direction of rotation, the elastic element 34 is decompressed and allowed to lengthen longitudinally, thus reducing the traction force with which the piston 18 is moved away from the delivery port 14.

The rod 37 has a central longitudinal axis 37A preferably eccentric with respect to the longitudinal central axis 18A of the piston 18. In this way, a rotation imparted to the rod 37 around its own axis 37A during the step of adjusting the position of the transverse contrast wall 36 it does not cause an undesired rotation also of the piston 18 around its axis 18A, with consequent wear of the seal gaskets mounted on the piston 18 and acting against the walls of the hydraulic chamber 15.

A transverse clearance between the edges of the transverse contrast wall 36 and the chamber 38 is desirable, to reduce friction during the longitudinal movement of the piston 18 together with the wall 36. To ensure that the rotation imparted to the rod 37 causes a screwing or unscrewing with respect to the contrast wall 36, it is preferable that at least a part of the peripheral edge of the wall 36 has a transversal distance P1 from the axis 37A greater than a minimum transversal distance P2 between the axis 37A and the internal surface of the chamber 38. In in this way, the internal surface of the chamber 38 acts as a contrast surface to rotationally lock the transverse wall 36 when the rod 37 is rotated.

The actuation device 42 that rotates the threaded rod 37 comprises an electric motor controlled by an electronic control unit (ECU, FIG. 1), mounted on board the vehicle.

In the hydraulic chamber 15, the brake fluid present in the first end section 19 closest to the delivery port 14 acts on a circular area of the piston 18 having a circumference of diameter D1, identified by the seals 26, 27. The brake fluid present in the first section, between the delivery port 14 and the seal 27, exerts on the piston 18 a longitudinal thrust, directed to the left in the attached drawings, away from the delivery port 14.

The brake fluid contained in the second intermediate section 20 of the hydraulic chamber 15 exerts a longitudinal hydraulic thrust on an area of the piston determined by an annulus having an outer circumference of diameter D2, corresponding to the diameter of the second intermediate section 20 of the hydraulic chamber 15, and an inner circumference of diameter D3, corresponding to the diameter of the third section 21 of the hydraulic chamber 15, farthest from the delivery port 14. The hydraulic thrust of the brake fluid in the second intermediate section 20 of the hydraulic chamber is directed to the right in the attached drawings, and pushes the piston 18 towards the delivery port 14.

The diameters D1, D2 and D3 of the respective three sections 19, 20 and 21 of the hydraulic chamber, and the diameters of the corresponding portions 22, 23 and 24 of the piston 18, are chosen in such a way that the area of an annulus delimited by the diameters D2 and D3 is greater than the area of a circle having a diameter D1. Consequently, the hydraulic forces acting on the piston 18 have a longitudinal net force which acts on the piston 18 pushing it towards the delivery port 14. This net force is hereinafter defined as "hydraulic net force". The hydraulic net force is longitudinally directed in the opposite direction to the force provided by the elastic element 34, which acts on the piston 18 away from the delivery port 14.

The piston 18 has one or more transverse surfaces, here defined as "first" transverse surfaces, facing the delivery port 14 and defining a first transverse area overall equivalent to the area of a circle having the aforementioned diameter D1. The piston 18 has one or more transverse surfaces, here defined as "second" transversal surfaces, facing away from the delivery port 14, that is, in an opposite direction with respect to the first transverse surfaces. The second transverse surfaces define altogether a second transverse area equivalent to the area of a annulus delimited by an outer circumference of diameter D2 and an inner circumference of diameter D3.

In the embodiments illustrated herein, the first transverse surfaces comprise a radially outermost annulus surface given by the piston end face 32, a radially intermediate annulus surface formed by a transverse shoulder 56 in the longitudinal cavity 31 and a central circular area 57 at the bottom of the cavity 31. Alternative embodiments (not shown) of the piston 18 can provide that the first surfaces are configured, sized and/or distributed differently on the surfaces of the piston facing the side of the delivery port 14. For example, forming the longitudinal cavity 31 of constant width, the shoulder 56 may be missing.

In the exemplary embodiment of FIGS. 2-6, the second transverse surfaces comprise two annuluses 58, 59 provided by the second intermediate portion 23, the widest portion of the piston 18. Embodiments (not shown) of the piston 18 may provide that the second surfaces be configured or distributed differently. For example, a single annulus surface lying in a single transverse geometric plane could be provided in place of the two surfaces 58, 59, here offset longitudinally with respect to each other.

A passage 50 is formed in the valve body 11 and opens on the end section 19 of the hydraulic chamber 15, establishing fluid communication between this chamber and the inlet port 17.

In the embodiments illustrated herein, a transverse bore 72 is formed in the body 11 for constructional reasons, in order to facilitate the construction of the passage 50. The transverse hole 72 is closed permanently by a closure schematically represented by 73.

For constructional reasons, the body 11 can consist of two or more complementary parts, in this example a right part 11a and a left part 11b. The right part 11a forms the hydraulic chamber 15, the inlet port 17 and the delivery port 14. The left part 11b is hermetically coupled with the right part 11a by means of a gasket 74.

Figure 2:
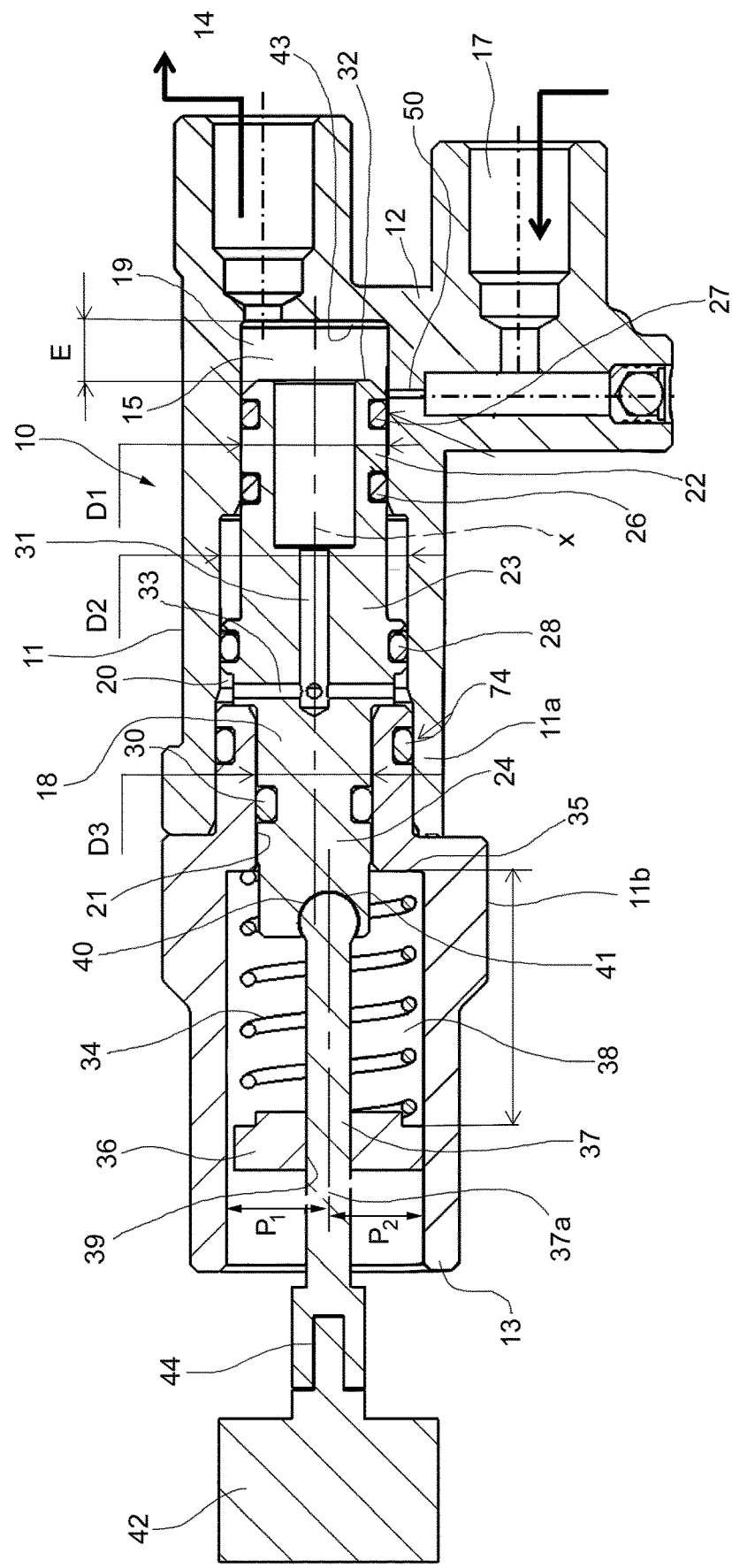
FIGS. 2 to 6 are longitudinal cross-sectional views of a valve unit according to a first embodiment of the present invention, in different operating conditions.
Figure 3:
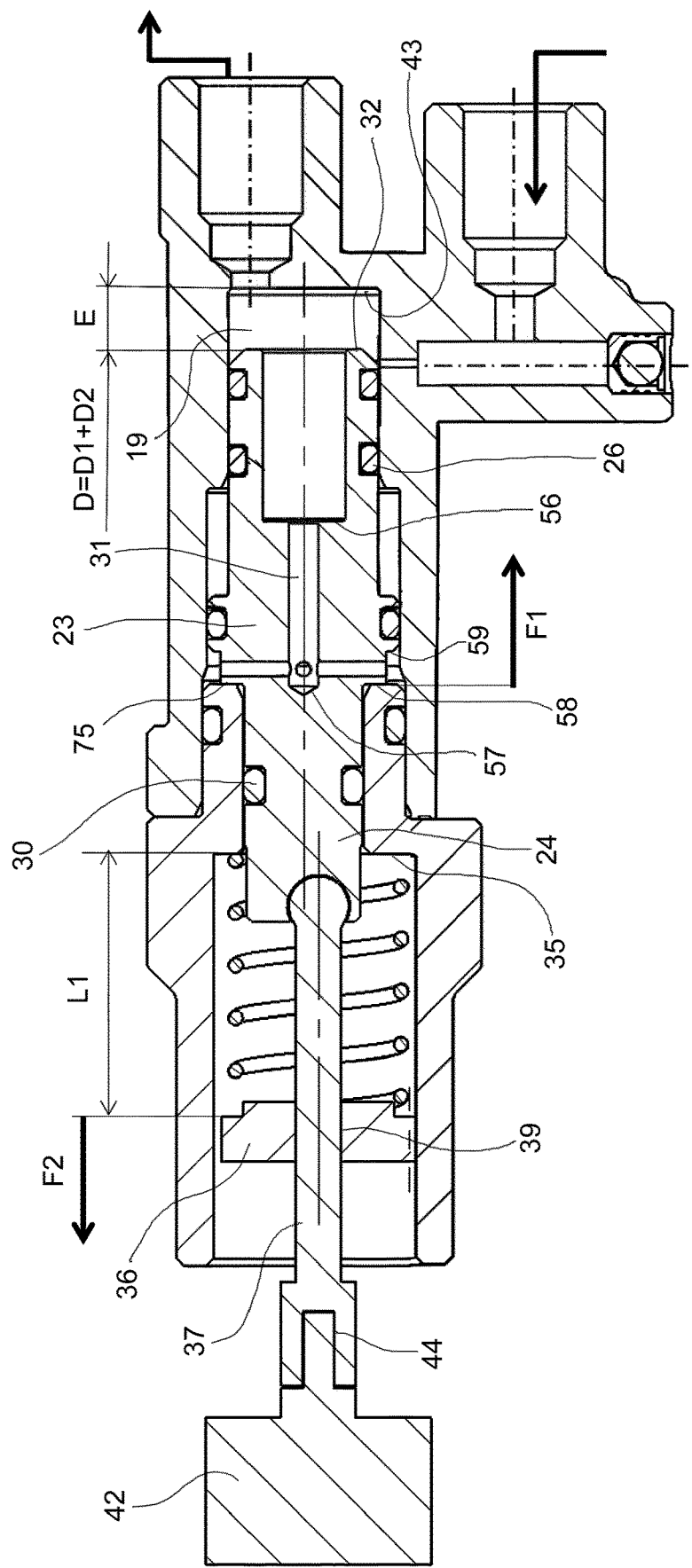
Figure 4:
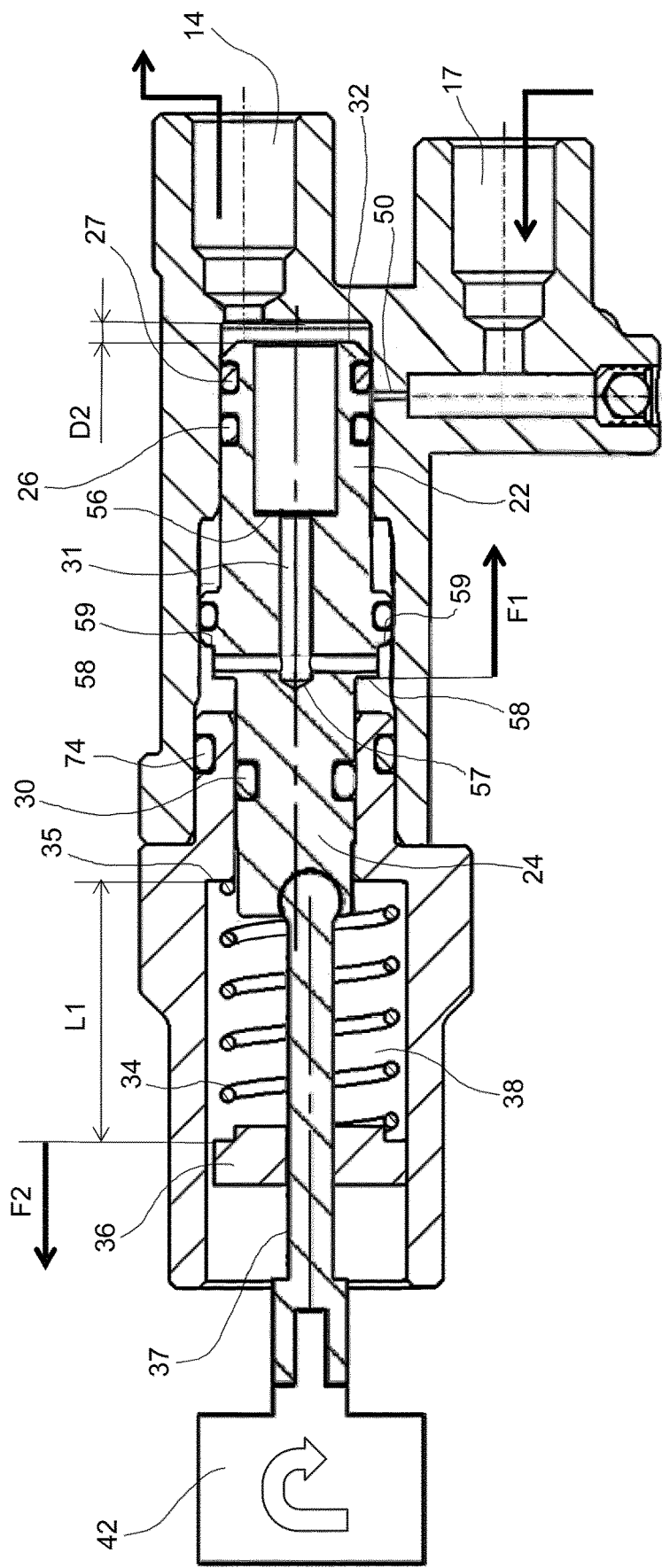

FIGS. 2 and 3 illustrate the valve unit 10 in normal braking conditions, i.e. when the vehicle is braking, but the caliper that receives the brake fluid from the delivery port 14 does not lock the wheel, which, therefore, does not slip. The brake fluid fills the hydraulic chamber 15, both in the first terminal section 19 and in the second intermediate section 20, due to the longitudinal cavity 31.

With moderate hydraulic pressures, which occur in a normal braking condition, i.e. without reaching a locked condition of the wheel, the hydraulic net force is of lesser intensity than the longitudinal force exerted by the elastic element 34. In other words, the elastic element 34 exerts a force F2 which pulls the piston 18 to the left, prevailing over the hydraulic net force F1 which would tend to move the piston 18 to the right. In this condition, the length of the elastic element 34 is indicated with L1. The end face 32 of the piston is located at a distance E from an end stop 43 near the delivery port 14.

In normal braking conditions, the force of the elastic element 34 keeps the piston 18 displaced to the left, away from the delivery port 14, in a rest position (or retracted position). In the rest position, the piston 18 can abut against a transverse shoulder 75 formed by the body 11.

When the piston 18 is in the rest position (FIG. 3), it does not obstruct the passage 50, allowing the brake fluid to pass through it and transit from the inlet port 17 to the delivery port 14 towards the brake caliper. The anti-lock braking system is not active.

In locked wheel braking conditions (FIG. 4), the electronic control unit ECU on board the vehicle receives speed signals from the wheel sensors indicating a locking or skidding situation of at least one of the vehicle's wheels. Under these conditions, the electronic control unit sends an activation signal to the actuation device 42 of the valve unit 10.

The actuation device 42 begins to rotate the rod 37 with respect to the transverse contrast wall 36 in a direction of rotation such that the rod moves to the right and begins moving the piston 18 to the right, approaching the delivery port 14. The elastic element 34 keeps its original length L1 unchanged, still exerting the elastic force F2.

The piston 18 then occludes the passage 50 (FIG. 4), whereby the flow of brake fluid from the main cylinder to the brake caliper through the valve unit is interrupted. At the instant in which this occurs, the pressure of the brake fluid in the hydraulic chamber 15 and in the part of the hydraulic circuit that includes the delivery port and the brake caliper is still equal to the pressure of the brake fluid upstream of the valve unit 10.

Figure 5:
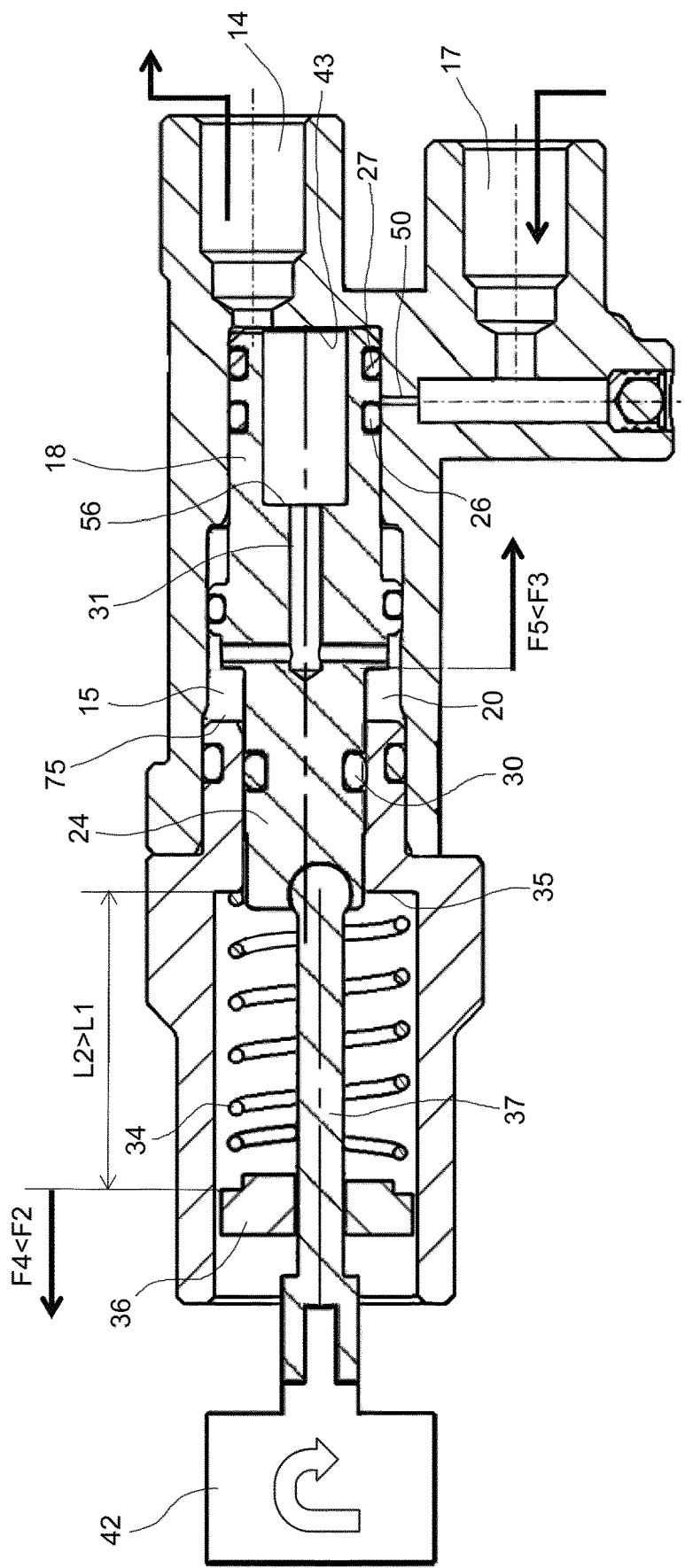

The actuation device 42 continues to rotate the rod 37, whereby the piston moves towards the delivery port (FIG. 5). In this phase, the overall volume available for the brake fluid inside the hydraulic chamber 15 increases, due to the fact that the area of the transverse surface of the piston facing (right) the delivery port 14 is smaller than the area of the transverse surface of the piston facing (left) away from the delivery port 14. Therefore, a displacement of the piston towards the delivery port reduces the volume in the hydraulic chamber 15 on the (right) side of the delivery port, but at the same time the displacement of the piston increases the volume in chamber 15 on the opposite side to the delivery port, and this volume increase on the left side has an absolute value greater than the simultaneous volume reduction on the right side. The brake fluid can then flow through the piston cavity 31 and pass from the right side of the hydraulic chamber to the left side, where more volume is available.

By virtue of the forgoing, a displacement of the piston 18 towards the delivery port reduces the pressure in the hydraulic chamber. The pressure drop in the hydraulic chamber also simultaneously reduces the brake fluid pressure in the branch of the hydraulic circuit extending from the delivery port to the brake caliper. The braking force exerted by the brake caliper is thus reduced, releasing the wheel.

A displacement of the piston 18 towards the delivery port is determined by the rotation of the rod 37, imparted by the drive 42, and by the hydraulic net force. When the end face 32 of the piston comes into contact with the end of stroke abutment 43 (FIG. 5), due to the effect of the threaded coupling between the rod 37 and the transverse wall 36, the continued rotation of the rod 37 causes the transverse contrast wall 36 to move further away from the shoulder 35. Consequently, the elastic element 34 can stretch, the length of which becomes L2 (with L2>L1). The elongation of the elastic element reduces the elastic force acting on the piston, resulting in a balance between the elastic force and the hydraulic thrust, both reduced.

Figure 6:
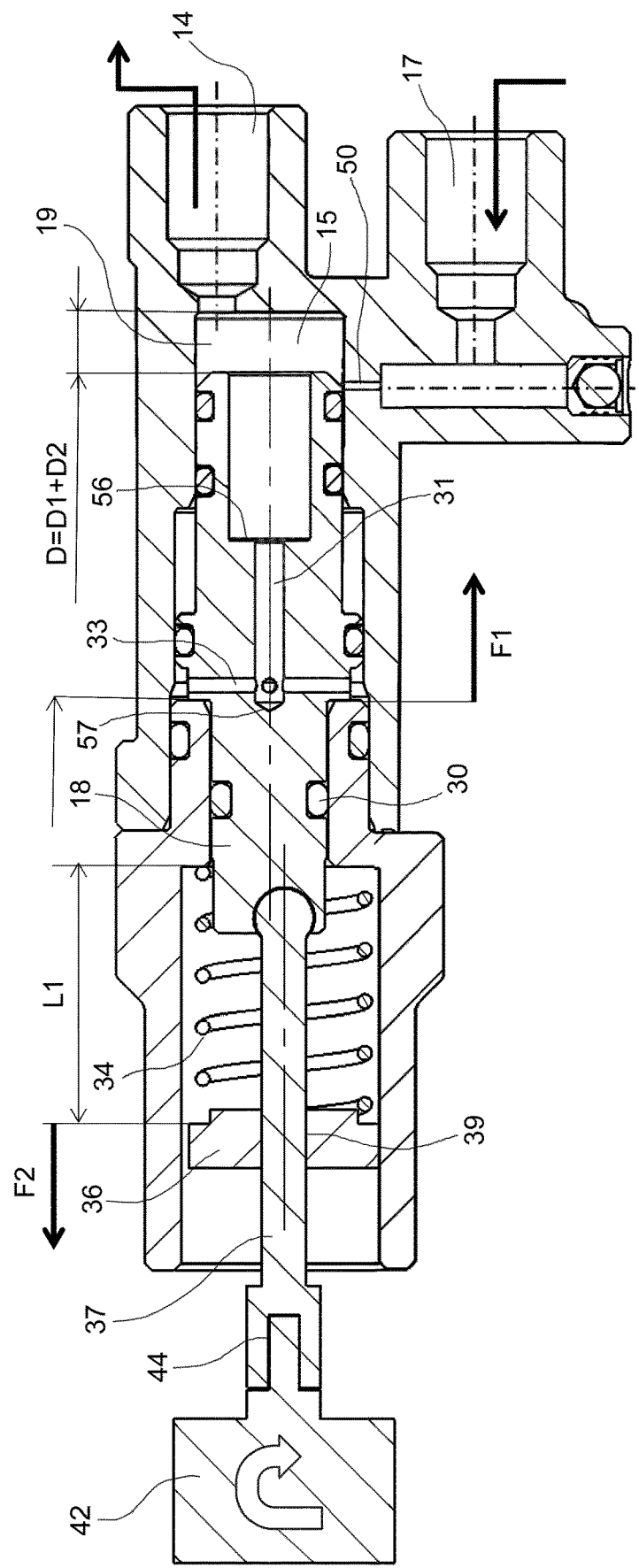
Figure 7:
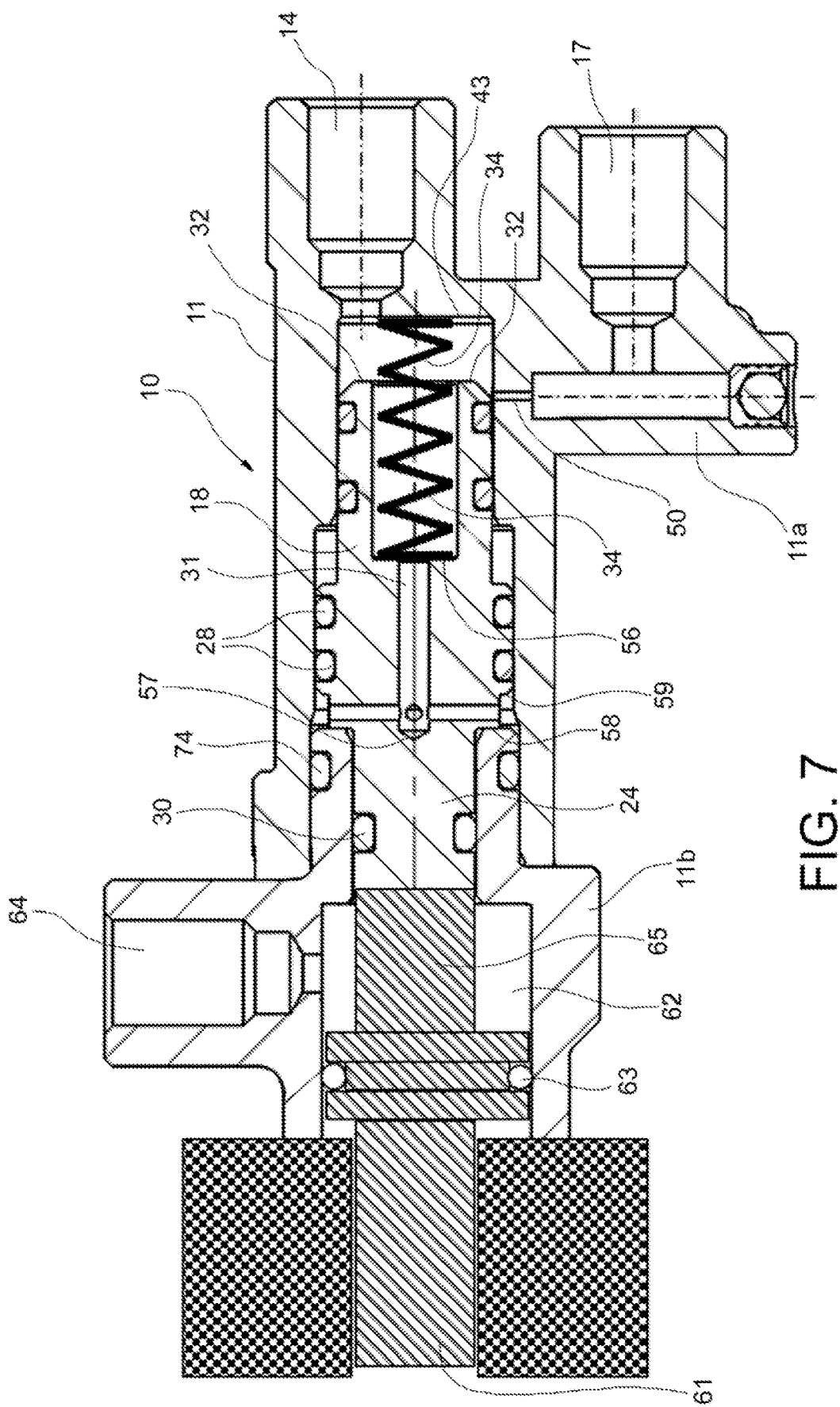
FIG. 7 is a longitudinal cross-sectional view of a valve unit according to another embodiment.

When the brake caliper is released, the electronic control unit ECU controls the actuation device 42 by inverting the direction of rotation of the rod 37 (FIG. 6). Therefore, the rod 37 pulls the piston to the left, moving it away from the delivery port 14 and translates the contrast wall 36 towards the delivery port 14, recompressing the elastic element 34. The passage 50 is reopened, so that the master cylinder is again in fluid communication with the brake caliper. The pressure of the brake fluid sent to the brake caliper can increase by repeating the cycle of steps in FIGS. 3 to 6.

Preferably, the actuation device 42 is rotationally coupled to the rod 37 but disengaged longitudinally from this, for example by means of a splined axial coupling 44, so as not to increase the inertial mass longitudinally integral with the piston 18.

Referring now to FIGS. 7 to 12, embodiments may provide that the force of the elastic element is assisted by a servomechanism that exploits the pressure of a pressurized fluid provided by the vehicle suspension system. In the following description of FIGS. 7 to 12, only the elements which differ from the embodiment of FIGS. 2 to 6 will be described.

An elastic element 34 is received in the longitudinal cavity 31, in this example a compression spring, elastically compressed between a shoulder 56 of the piston and the stop 43 of the stroke end for the piston, presented by the hydraulic chamber adjacent to the delivery port 14 The elastic element 34 urges the piston 18 away from the delivery port 14.

The valve unit 10 (FIG. 7) may be associated with an electromagnetic solenoid 80 with which can be electrically activated to displace the piston 18 longitudinally towards the delivery port 14. The solenoid 80 may be electrically connected to the electronic control unit ECU which controls the speed of rotation of the wheels and is capable of detecting a condition indicative of an impending locking of a wheel and of providing a control signal to energize the solenoid 80.

The piston 18 has an actuation portion 61 operatively associated with the solenoid actuator 80 and integral with or secured to the proximal portion 24 of the piston 18. The actuation portion 61 may comprise ferromagnetic material.

A pressure servomechanism comprises an auxiliary fluidic chamber 62, cylindrical in shape, which surrounds a portion 65 of the piston 18, herein defined as auxiliary portion, intermediate between the actuation portion 61 and the proximal portion 24 of the piston. The auxiliary fluidic chamber 62 of the piston has an auxiliary seal 63 which is slidingly and sealingly engaged against the cylindrical wall of the auxiliary fluidic chamber 62. The auxiliary seal 63 is mounted on the piston 18 in a position farther away from the delivery port 14 with respect to the proximal seal 30 which is located on the proximal portion 24 of the piston.

Figure 8:
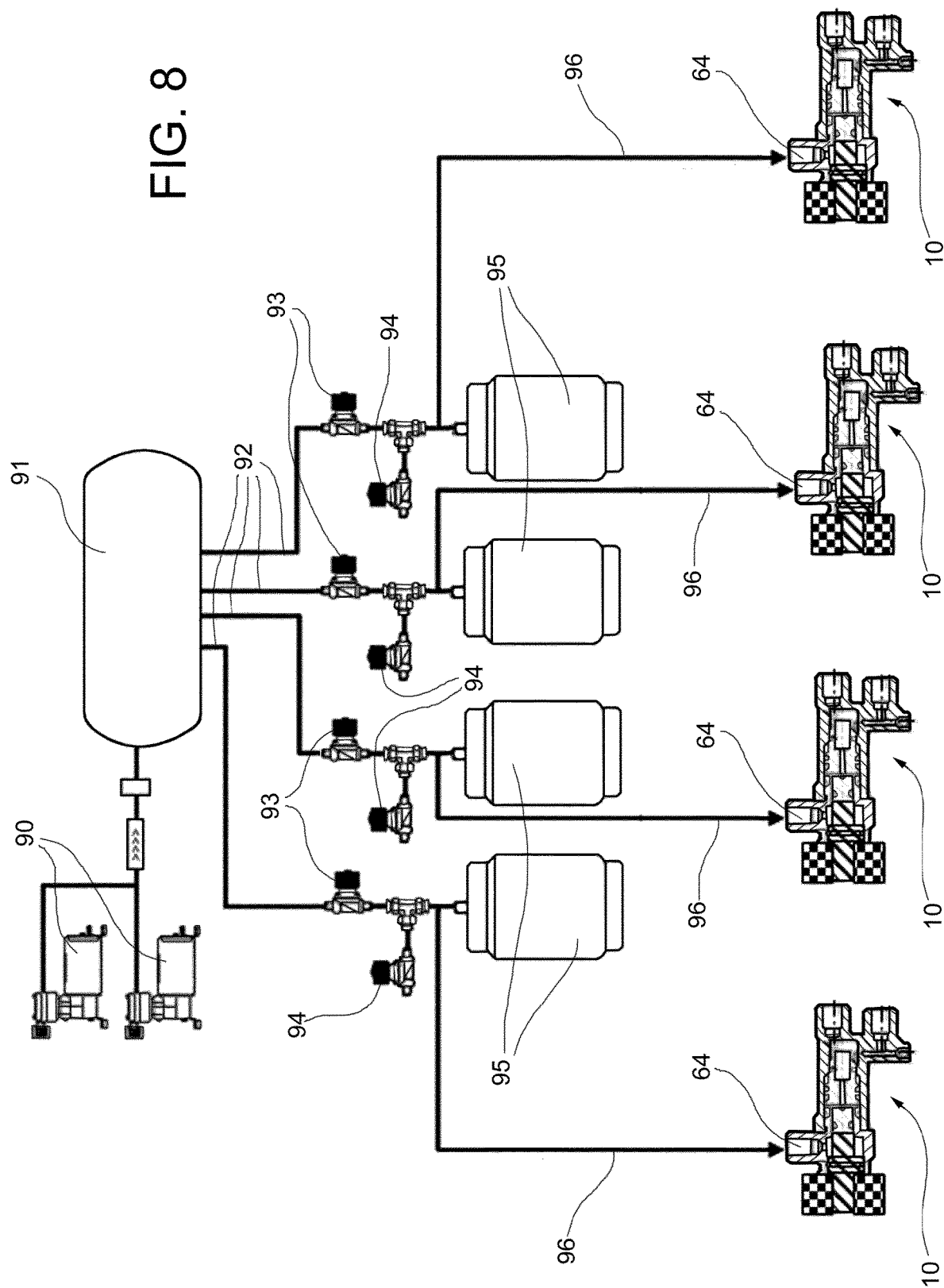
FIG. 8 is a schematic representation illustrating valve units of the type shown in FIG. 7 associated with an air suspension system of a vehicle.

An auxiliary inlet port 64, fluidically connectable to a vehicle suspension system, opens onto the auxiliary fluidic chamber 62 in an intermediate position between the auxiliary seal 63 and the proximal seal 30. The pressurized fluid entering the fluidic chamber auxiliary can be provided, for example, by an air bag 95 of an air suspension (FIG. 8).

Figure 9:
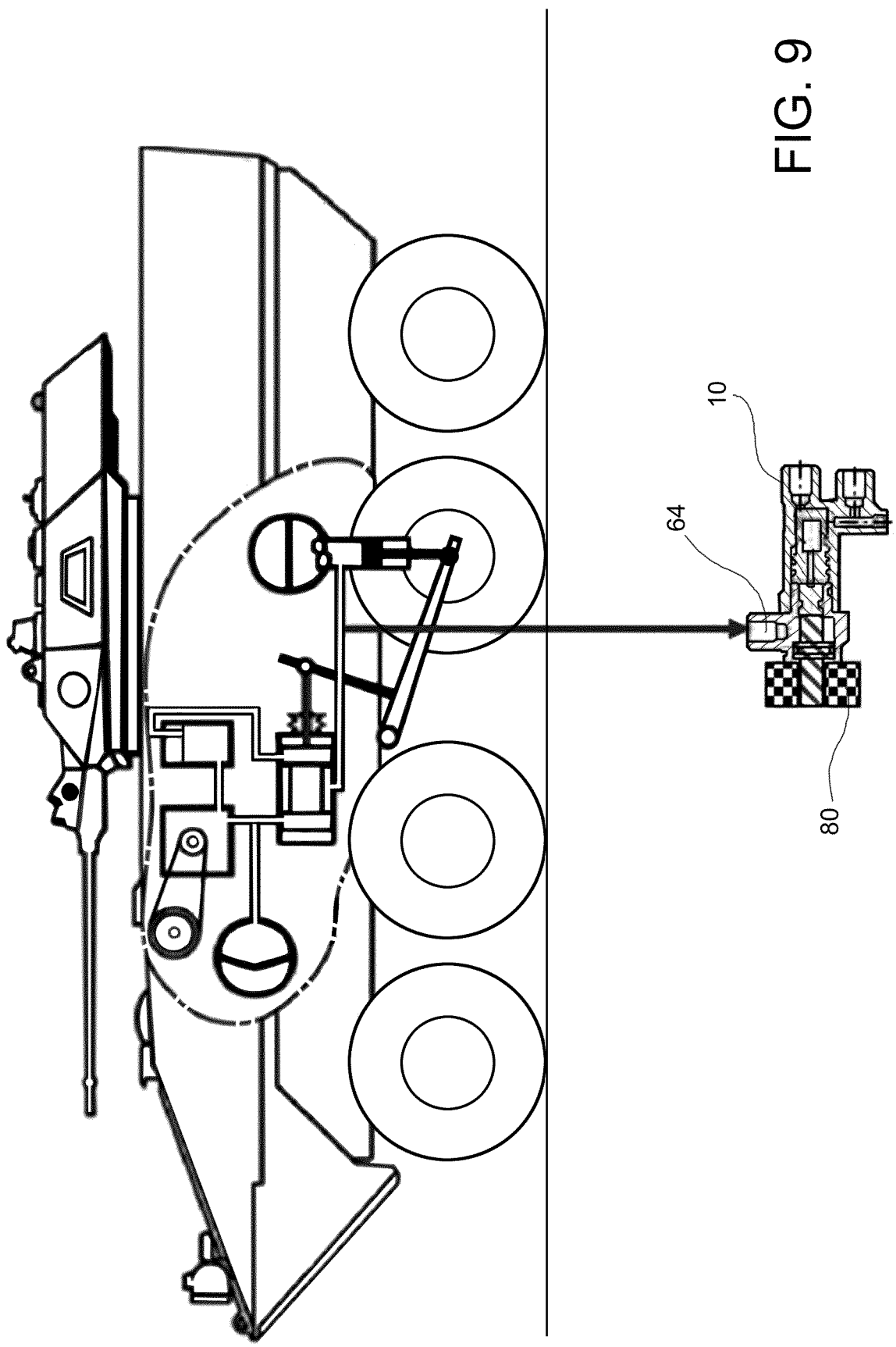
FIG. 9 is a schematic representation showing the valve unit of FIG. 7 associated with a hydropneumatic suspension system of a vehicle.

Self-leveling pneumatic suspension systems, as schematically represented in FIG. 9, are per se known in the art and, therefore, will not be described in detail herein. Suffice it here to indicate that a pair of compressors 90 feed pressurized air to a tank 91 which control the supply of pressurized air through ducts 92 with inflation valves 93 and bleed valves 94 to respective air bags 95 in order to dynamically balance the suspensions of each of the wheels (not shown) of a vehicle. According to a possible embodiment, each air bag 95 can supply pressurized fluid (pressurized air, in the example of FIG. 8) to the valve unit 10 of the vehicle's ABS system. A pressurized air line 96 supplies pressurized air from each air bag 95 to a respective inlet port 64 of an ABS valve unit 10. Alternatively, the pressurized suspension fluid may be oil from a hydraulic or hydro-pneumatic suspension system (FIG. 9).

For constructional reasons, the body 11 may consist of two or more complementary parts, in this example a main part 1a and a connection part 11b fixed to the actuation solenoid 80. The main part 1a forms the hydraulic chamber 15, the port of inlet 17 and the delivery port 14. The connection part 11b, in the example illustrated here, has the auxiliary inlet port 64 and can be hermetically coupled with the main part 11a by means of a gasket 74.

For assembly reasons, the piston 18 may conveniently be made up of several parts manufactured separately and then mechanically joined together when assembling the piston in the body 11.

Figure 10:
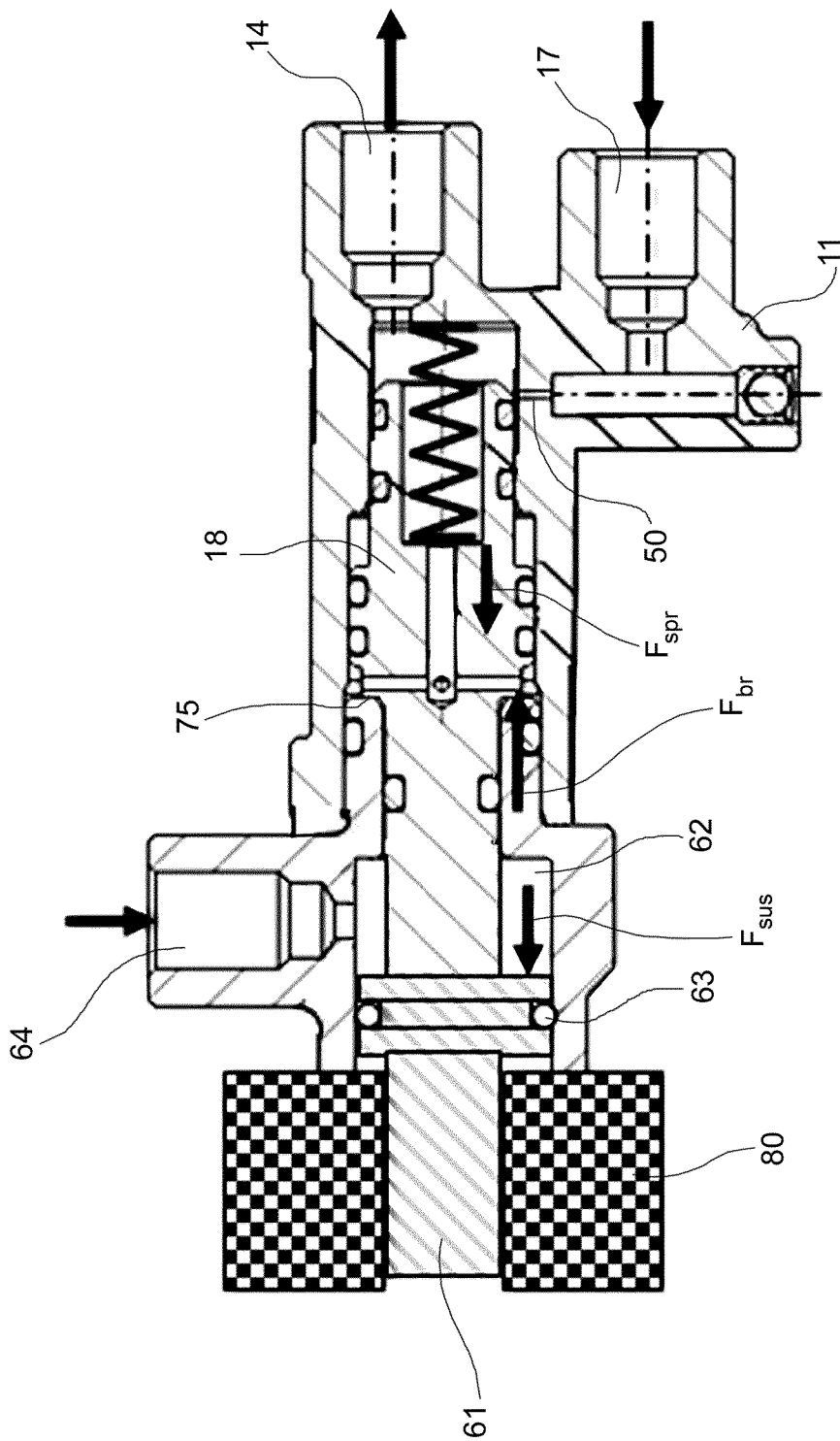
FIGS. 10 to 12 are schematic views showing longitudinal cross-sections the valve unit of FIG. 7 in different operational conditions.

In FIG. 10, the valve unit is depicted in normal braking conditions. The fluid pressure of the suspension system is present in the auxiliary fluidic chamber, with consequent generation of an auxiliary force Fsus which urges the piston 18 away from the delivery port 14, cooperating with the force Fspr provided by the elastic element 34. Under normal braking conditions, i.e. without reaching a locking condition of the braked wheel, the hydraulic net force FBR is less intense than the combined longitudinal force FSUS+FSPR exerted by the suspension and the elastic element 34 (Fsus+Fspr>Fbr). Under normal braking conditions, therefore, the piston 18 is displaced to the left, away from the delivery port 14, into a rest position (or retracted position). In the rest position, the piston 18 abuts against the transverse shoulder 75 formed by the body 11. The piston 18, in the rest position (FIG. 10), does not obstruct the passage 50, allowing the direct passage of the brake fluid through it, from the inlet port 17 to the delivery port 14 towards the brake caliper. The anti-lock braking system is not active.

Figure 11:
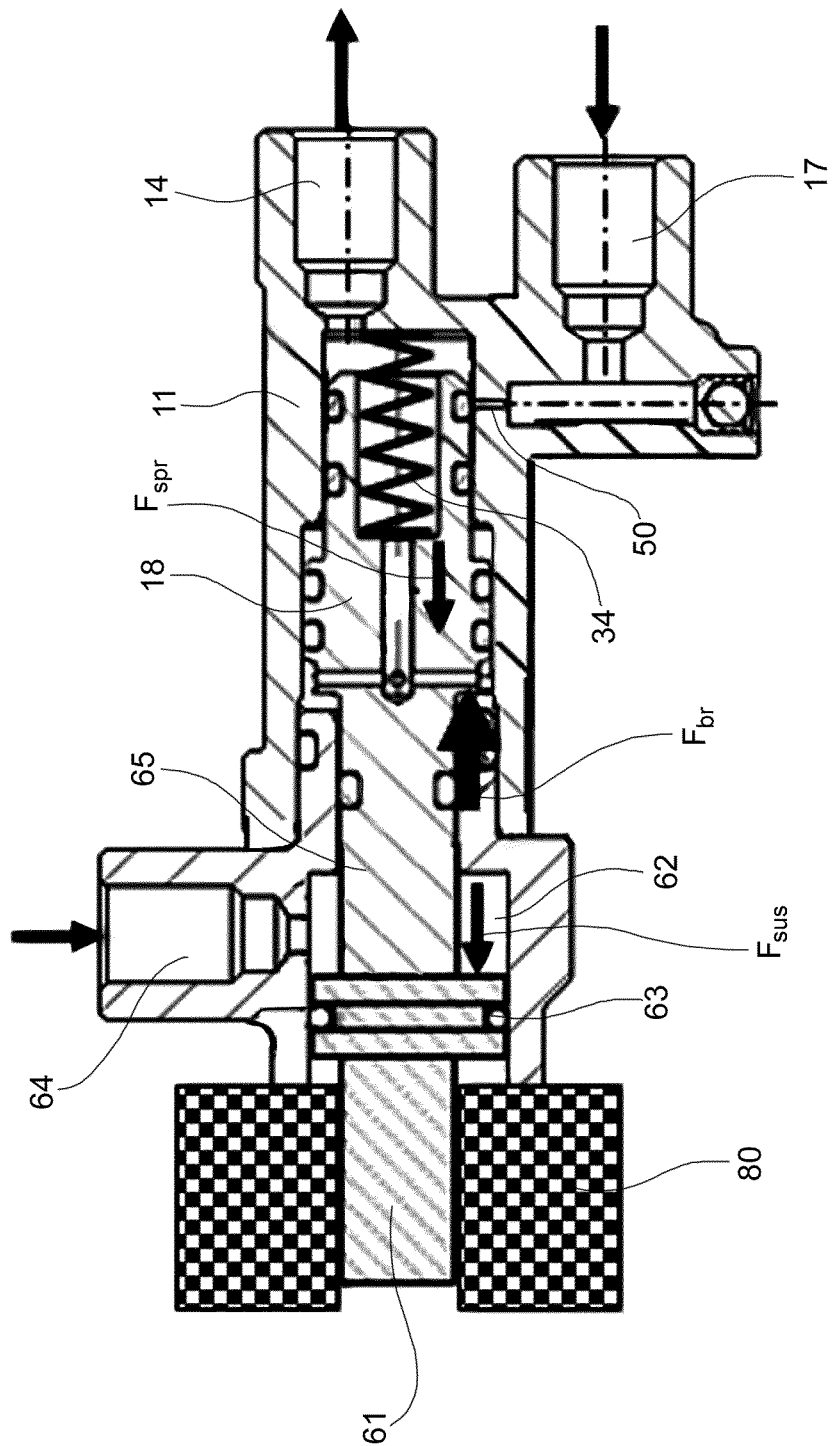
Figure 12:
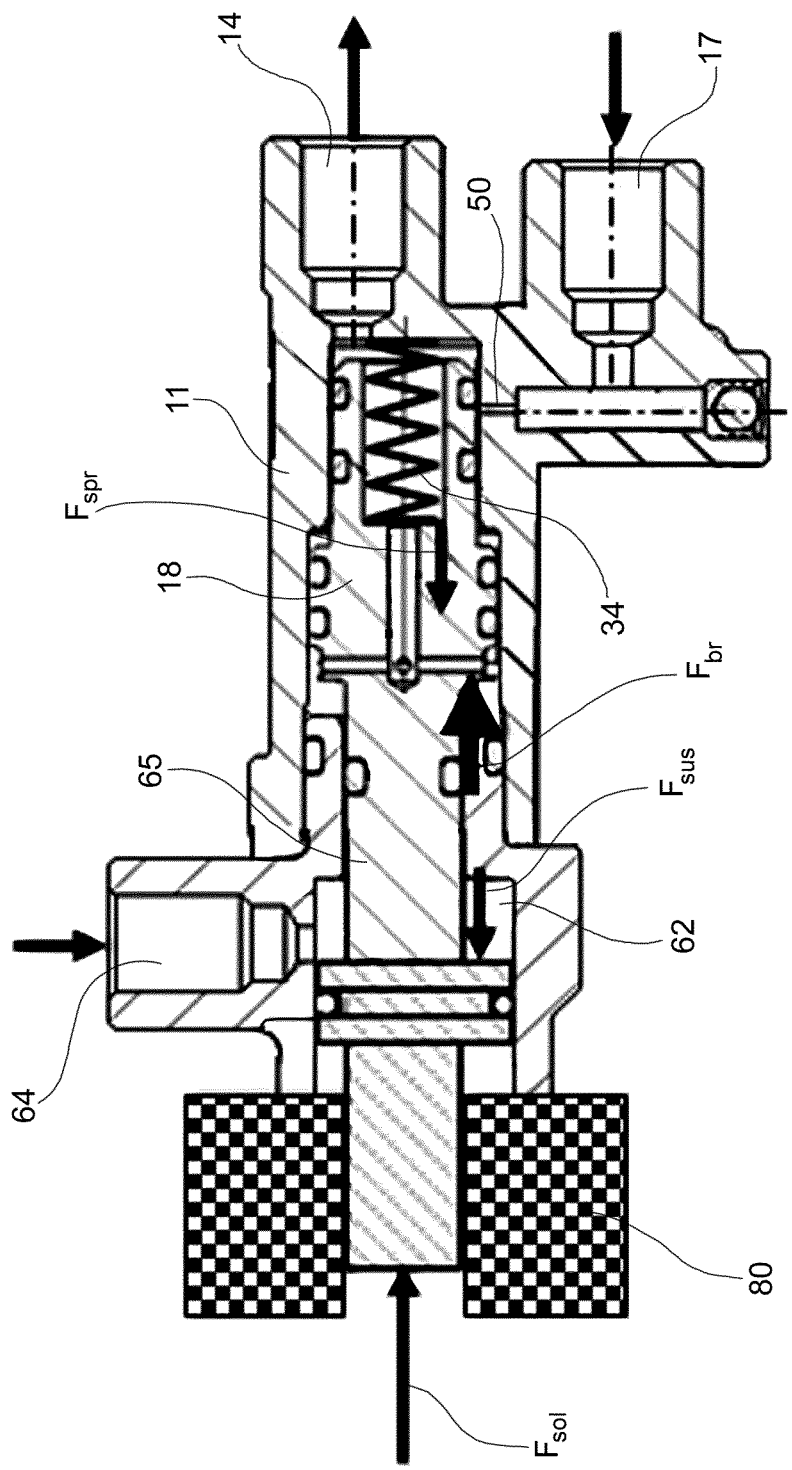

In FIG. 11 the valve unit is illustrated in a braking phase, where the pressure of the brake fluid in the brake circuit increases inside the brake circuit and therefore also in the hydraulic chamber 15 of the ABS valve unit 10. Therefore, by virtue of the above described shape of the piston 18, the hydraulic net force Fbr increases as the pressure of the brake fluid in the hydraulic circuit of the brake system increases. The auxiliary force Fsus applied to the piston 18 can vary dynamically due to the load transfer during braking.

When the hydraulic net force Fbr exceeds the sum of the auxiliary force and the elastic element, Fbr>(Fsus+Fspr), the piston 18 moves to the right, occluding the passage 50 (FIG. 11). The brake fluid pressure acting on the brake caliper cannot be increased further.

In locked wheel braking conditions (FIG. 12), the electronic control unit ECU on board the vehicle receives speed signals from the wheel sensors indicating a locking or slipping situation of at least one of the vehicle's wheels. Under these conditions, the electronic control unit energizes the solenoid actuator 80, which transmits an additional force Fsol to the piston 18, causing the piston to move further to the right. Since the area of the right cross section in the hydraulic chamber 15 (towards the delivery port 14) is smaller than the area of the left cross section, as the piston moves to the right, the brake fluid in the hydraulic chamber 15 passes through the longitudinal cavity 31 on the left side, progressively larger. The increase in the volume available for the brake fluid consequently reduces the pressure acting on the brake caliper circuit, so that the braking torque acting on the wheel is reduced and the wheel is unlocked.

When the brake caliper is released, the electronic control unit ECU cuts power to the solenoid, so that the elastic element 34 and the pressure of the pressurized fluid from the suspension bring the piston 18 back to the left, away from the delivery port 14. The passage 50 is reopened, whereby the master cylinder is again in fluid communication with the brake caliper. The pressure of the brake fluid sent to the brake caliper can increase by repeating the cycle of steps in FIGS. 9 to 12.

It can be observed that as the pressure of the brake fluid increases, the hydraulic net force Fbr increases but the force Fsol that is generated by the actuation solenoid in order to move the piston and reduce the pressure acting on the brake caliper is reduced.

It will be appreciated that, in general, during braking, the load acting on the front wheels increases, while the rear wheels are relieved. There is therefore a need to provide higher force to hold the piston in the ABS valve in the open position even when the braking pressure is very high. During braking, therefore, the front wheel air bags in a vehicle with a pneumatic suspension are compressed more than the rear wheel air bags, and the increase in the air pressure inside them will produce an increase in the Fsus force. Therefore, a greater braking torque may be applied to the front wheels, which are more loaded, and this will allow to take advantage of the greater grip. A less intense force Fsus will be applied to the ABS valves of the rear wheels, lightened during braking and therefore more susceptible to skidding, which reduces the risk of wheel locking due to the reduced grip of the rear wheels during braking.

It will be appreciated that the valve unit described here allows to progressively increase the volume in the hydraulic circuit on the side of the brake caliper, thus gradually reducing the pressure in the brake caliper. The present valve unit offers better performance than a conventional valve unit having with a second hydraulic expansion or accumulation chamber, in which the pressure is released abruptly at the instant a flow passage opens and removes brake fluid from the part of the brake circuit which includes the caliper, and which therefore requires a pump to refill that part of the circuit by restoring the fluid that has been temporarily removed from the caliper.

Figure 13:
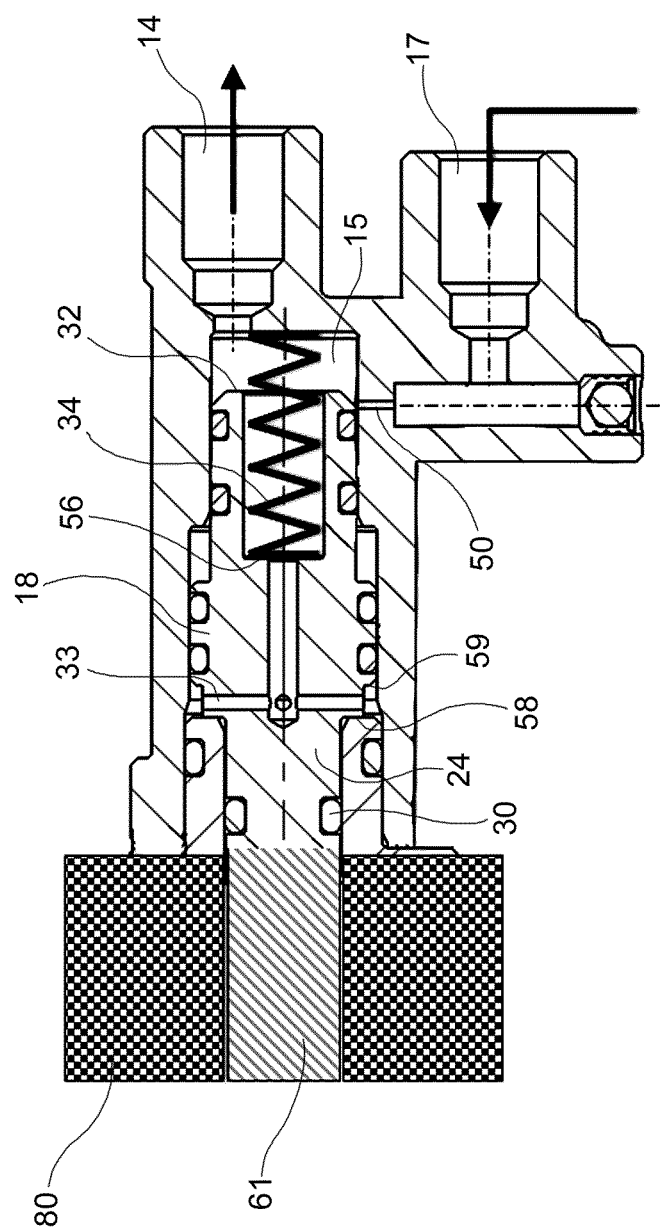
FIG. 13 is a longitudinal sectional view of a valve unit according to a further embodiment.
Figure 14:
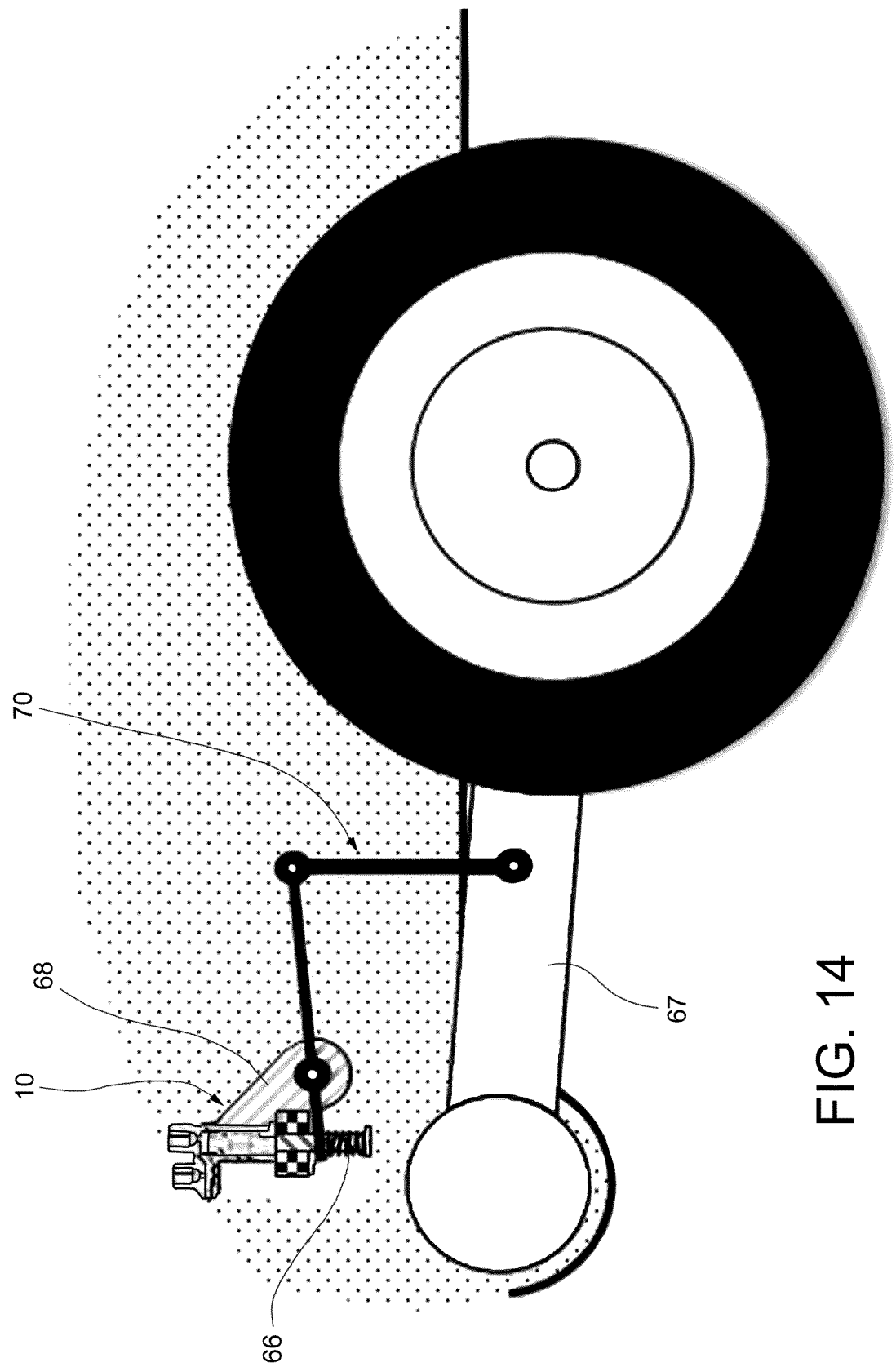
FIGS. 14 to 17 schematically illustrate an ABS valve unit applied to a vehicle suspension in different various operating conditions.
Figure 15:
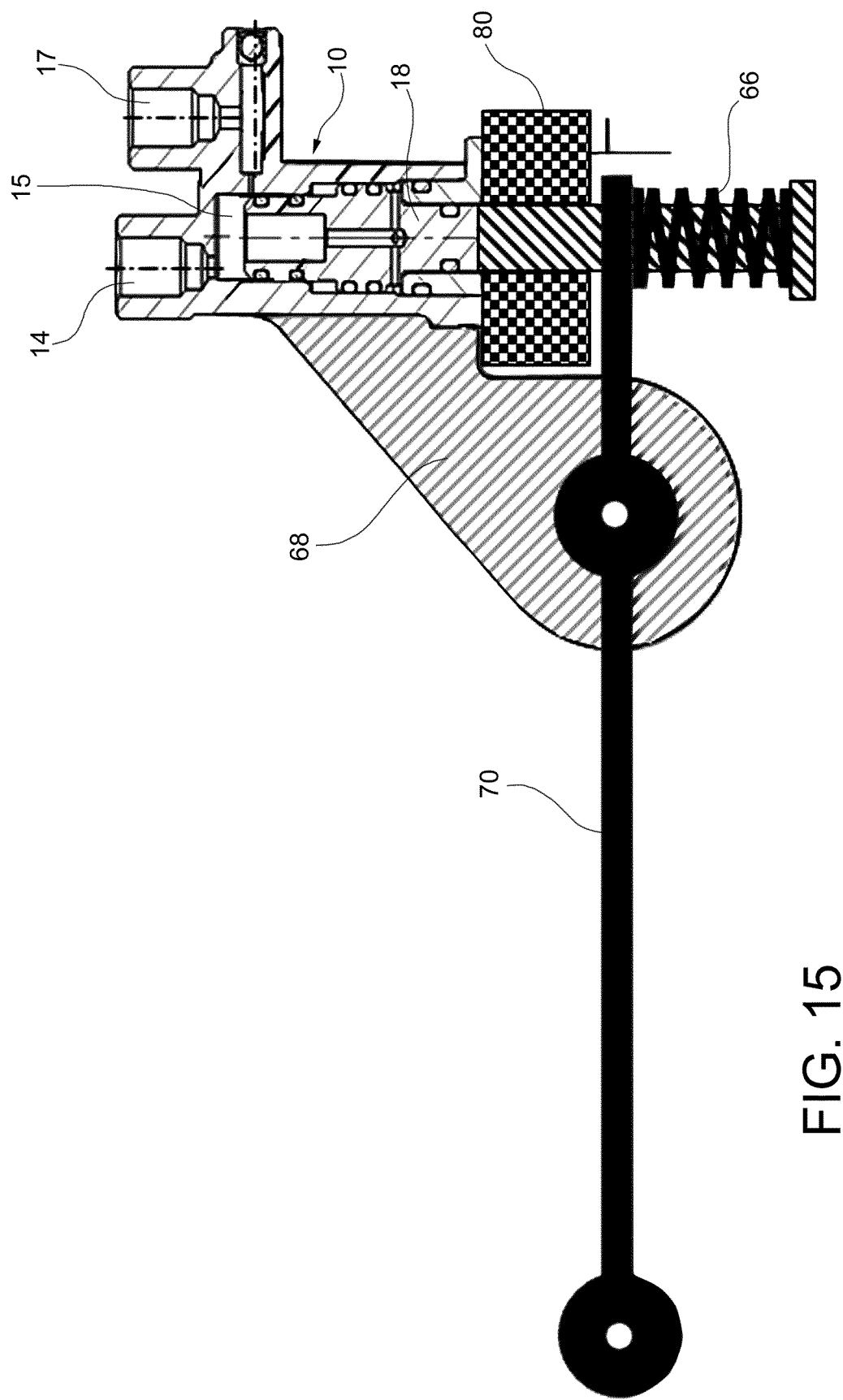
Figure 17:
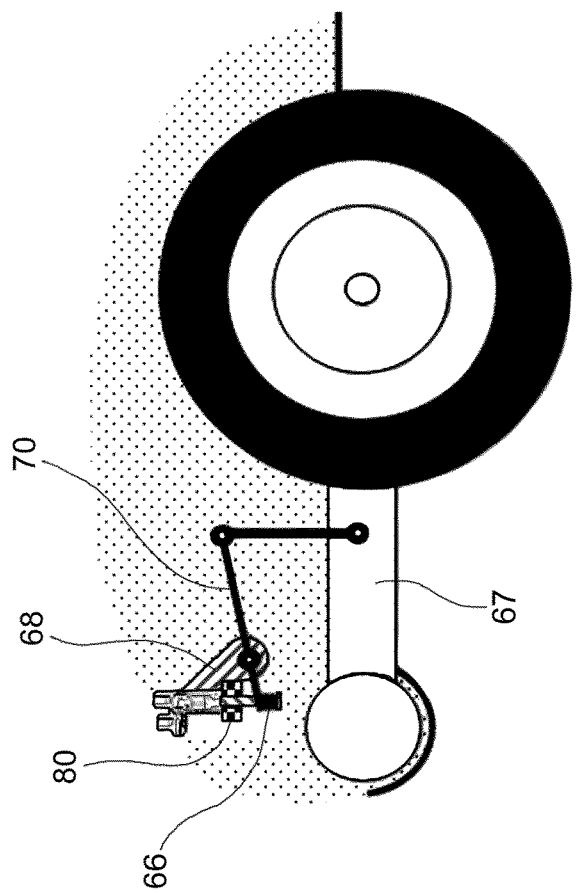
Figure 16:
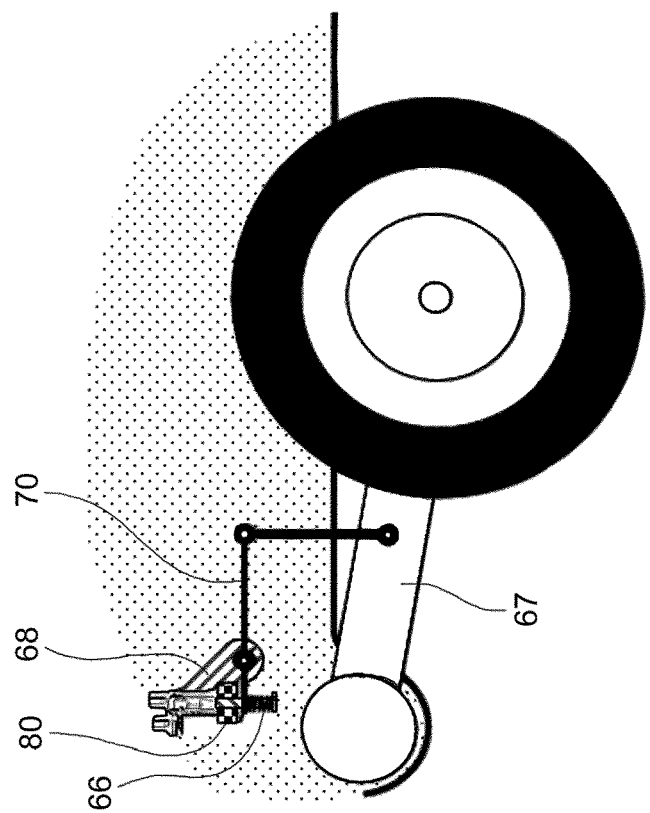

FIG. 13 shows a simplified embodiment, as an alternative to those of FIGS. 2-6 and FIGS. 7-12. The piston actuation device comprises an electromagnetic solenoid 80, electrically activated by the electronic control unit ECU to move the piston 18 longitudinally towards the delivery port 14.

An elastic element 34 is received in the longitudinal cavity 31, elastically compressed between a shoulder 56 of the piston and the abutment 43, provided by the hydraulic chamber adjacent to the delivery port 14 and acting as an end of stroke for the piston. The elastic element 34 urges the piston 18 away from the delivery port 14.

The piston 18 has an actuation portion 61 operatively associated with the solenoid 80 and integral with or secured to the proximal portion 24 of the piston 18. The actuation portion 61 may comprise ferromagnetic material.

In FIG. 13, the valve unit is shown in normal braking conditions. In such conditions, the force provided available by the elastic element 34 is of greater intensity than the hydraulic net force. The piston 18 is displaced to the left, away from the delivery port 14, in a rest position (or retracted position), abutting the transverse shoulder 75 formed by the body 11. The piston 18, in the rest position, does not occlude the passage 50, allowing the brake fluid to pass through it from the inlet port 17 to the delivery port 14 towards the brake caliper. The anti-lock braking system is not active.

During braking, by virtue of the above described shape of the piston 18, the hydraulic net force increases as the pressure of the brake fluid in the hydraulic circuit of the brake system increases. When the hydraulic net force exceeds the force of the elastic element, the piston 18 moves to the right, occluding the passage 50 (similarly to what is described with reference to FIGS. 10 and 11). The brake fluid pressure acting on the brake caliper cannot be increased further.

In locked wheel braking conditions, the electronic control unit ECU energizes the actuation solenoid 80, which transmits an additional force to the piston 18, causing the piston to move further to the right. Since the area of the right cross section in the hydraulic chamber 15 (on the side of the delivery port 14) is smaller than the area of the left cross section, as the piston moves to the right, the brake fluid in the hydraulic chamber 15 passes through longitudinal cavity 31 in the left side, more capacious. The capacity in the left side of the hydraulic chamber increases to a greater extent than the capacity in the right side of the hydraulic chamber, which is simultaneously reduced. Therefore, the displacement of the piston towards the delivery port increases the overall capacity of the hydraulic chamber 15 and of the part of the hydraulic circuit downstream of the ABS valve unit and including the locked brake caliper. The increase in the volume available for the brake fluid consequently reduces the pressure acting on the brake caliper circuit, so the braking torque acting on the wheel is reduced and the wheel is unlocked.

When the brake caliper is released, the electronic control unit ECU cuts power to the solenoid, so that the elastic element 34 moves the piston 18 towards the left away from the delivery port 14. The passage 50 is reopened, whereby the master cylinder is again in fluid communication with the brake caliper. The pressure of the brake fluid supplied to the brake caliper can increase, repeating the operating cycle described above.

Alternative embodiments may provide that the auxiliary force Fsus, generated by the suspension, is transmitted to the piston 18 by a mechanism connected to a suspension arm, exploiting the weight force acting on the suspension.

In the example of FIGS. 14-17, a spring 66 connected by a linkage 70 to a suspension arm 67 is associated with the piston 18 of the ABS valve unit to transmit an increased auxiliary force Fsus when the vertical load on the suspension increases. The valve unit 10 is fixed to a bracket 68 integral with the vehicle body 69. When the load acting on the suspension is low (FIG. 16), the auxiliary force transmitted to the vertically oriented piston 18 is low. Conversely, when the load acting on the suspension is high (FIG. 17), the auxiliary force Fsus transmitted to the piston 18 increases.

Advantageously, the control of the actuation solenoid takes place in PWM (Pulse Width Modulation), which allows to vary the proportion between the on time with respect to the off time of the solenoid coil during its quick on/off switching.

Although FIG. 1 illustrates a system with separate ABS valves for each wheel, embodiments may provide that several or all of the ABS valves on a vehicle may be physically grouped together inside one valve body or enclosure.

While specific embodiments of the invention have been disclosed, it is to be understood that such disclosure has been merely for the purpose of illustration and that the invention is not to be limited in any manner thereby. Various modifications will be apparent to those skilled in the art in view of the foregoing examples. The scope of the invention is to be limited only by the appended claims.

What is claimed is:

1. A valve unit for an anti-lock braking system of a vehicle, the valve unit comprising:
   a single hydraulic chamber configured to receive a brake fluid, with a delivery port for supplying the brake fluid to a brake caliper, and a passage to for letting the brake fluid from a master cylinder into the single hydraulic chamber;
   a single piston longitudinally movable within the single hydraulic chamber, with
   one or more first transverse surfaces facing the delivery port and defining as a whole a first transverse area,
   one or more second transverse surfaces facing away from the delivery port and defining as a whole a second transverse area greater than the first transverse area, and
   a longitudinal cavity that extends into the single piston establishing fluid communication between the one or more first transverse surfaces and the one or more second transverse surfaces,
   whereby a displacement of the single piston towards the delivery port occludes said passage and increments a volume available for the brake fluid in the single hydraulic chamber.

2. The valve unit of claim 1, wherein
   the single hydraulic chamber forms
   a first section arranged closer to the delivery port and having a first diameter,
   a third section arranged farthest from the delivery port and having a third diameter smaller than the first diameter, and
   a second section, intermediate between the first section and the third section, having a second diameter greater than the first diameter;
   the single piston comprises
   a first portion sealingly sliding in the first section of the single hydraulic chamber,
   an intermediate portion sealingly sliding in the second section of the single hydraulic chamber, and
   a third portion sealingly sliding in the third section of the single hydraulic chamber;
   said one or more first transverse surfaces having an area of a circle having the first diameter, and said one or more second transverse surface has the surfaces having an area of an annulus having an outer circumference with a diameter corresponding to the second diameter and an inner circumference with a diameter corresponding to the third diameter.

3. The valve unit of claim 2, wherein the valve unit comprises an actuation device, electrically connectable to an electronic control unit (ECU) mounted on board of the vehicle, for longitudinally displacing the single piston towards the delivery port in response to an electrical signal from the ECU, wherein the actuation device comprises an actuation solenoid electrically activable by the ECU, wherein the single piston comprises an actuation portion operatively associated to the actuation solenoid, and wherein the actuation portion of the piston is integral with or secured to the third portion of the piston.

4. The valve unit of claim 2, wherein said one or more first transverse surfaces comprise a radially outermost annulus surface presented by an end face of the single piston, and a central circular area at one end of the longitudinal cavity farthest from the end face.

5. The valve unit of claim 4, wherein said one or more first transverse surfaces comprise a radially intermediate annulus surface provided by a transverse shoulder in the longitudinal cavity.

6. The valve unit of claim 2, wherein said one or more second transverse surfaces comprise one or two transverse surfaces in the form of annuluses provided by the intermediate portion of the single piston.

7. The valve unit of claim 1, further comprising at least one elastic element exerting an elastic force to move the single piston away from the delivery port.

8. The valve unit of claim 7, wherein the at least one elastic element is received in the longitudinal cavity and is compressed elastically between a transverse shoulder of the single piston and an end stop for the single piston, presented by the single hydraulic chamber adjacent to the delivery port.

9. The valve unit of claim 1, further comprising an actuation device, electrically connectable to an electronic control unit mounted on board of the vehicle, for longitudinally displacing the single piston towards the delivery port in response to an electrical signal from the ECU.

10. The valve unit of claim 9, wherein the valve unit comprises at least one elastic element exerting an elastic force to move the single piston away from the delivery port, wherein the valve unit further comprises
    a valve body that forms said single hydraulic chamber and a transverse shoulder facing away from the delivery port,
    a transverse contrast wall, facing the transverse shoulder and longitudinally spaced from the transverse shoulder, and
    a rod longitudinally connecting the transverse contrast wall to the single piston, wherein the at least one elastic element includes at least one compression spring, compressed longitudinally between the transverse contrast wall and the transverse shoulder, and wherein the actuation device is configured to rotate the rod around a longitudinal axis and consequently adjust a longitudinal distance between the transverse contrast wall and the single piston.

11. The valve unit of claim 10, wherein the valve unit is configured to transmit to the single piston an auxiliary force from a vehicle suspension, and wherein the auxiliary force urges the single piston longitudinally away from the delivery port.

12. The valve unit of claim 11, comprising a pressure servomechanism operatively associated with the single piston, the pressure servomechanism comprising a cylindrical auxiliary fluid chamber, integral with the valve body of the valve unit, wherein the cylindrical auxiliary fluid chamber surrounds an auxiliary portion of the single piston, an auxiliary inlet port that opens onto the cylindrical auxiliary fluid chamber and is fluidically connectable to a vehicle suspension system to let a pressurized fluid of the vehicle suspension system into the cylindrical auxiliary fluid chamber, an auxiliary seal that sealingly engages against a cylindrical wall of the cylindrical auxiliary fluid chamber, wherein the auxiliary seal is mounted on the single piston and is farther away than the auxiliary inlet port from the delivery port.

13. The valve unit of claim 12, wherein the pressurized fluid is pressurized air coming from an air bag of a pneumatic suspension system, or said pressurized fluid is a pressurized liquid of a hydraulic or hydro-pneumatic suspension system.

14. The valve unit of claim 11, wherein the single piston is mechanically connected to the vehicle suspension to receive from the vehicle suspension a thrust away from the delivery port when a load on the vehicle suspension increases.

15. The valve unit of claim 9, wherein the actuation device comprises an actuation solenoid electrically activable by the ECU and wherein the single piston comprises an actuation portion operatively associated to the actuation solenoid.

16. The valve unit of claim 1, lacking a second hydraulic expansion chamber fluidly connectable to the single hydraulic chamber by a flow passage closable by the single piston.

* * * * *